May 25, 1971  R. E. OTT  3,580,733
FOOD COOKING APPARATUS HAVING CONTINUOUS CLEANING
PROPERTIES AND PROCESS FOR PRODUCING SAME
Filed April 17, 1969  7 Sheets-Sheet 7

United States Patent Office 3,580,733
Patented May 25, 1971

3,580,733
FOOD COOKING APPARATUS HAVING CONTINUOUS CLEANING PROPERTIES AND PROCESS FOR PRODUCING SAME
Robert E. Ott, Bel Air, Md., assignor to SCM Corporation, Cleveland, Ohio
Filed Apr. 17, 1969, Ser. No. 817,128
Int. Cl. C23d 5/00
U.S. Cl. 117—129                                                11 Claims

ABSTRACT OF THE DISCLOSURE

An improvement in the process for producing an adherent ceramic coating on a metal substrate used in food cooking apparatus, the coating having the continuous cleaning property of diminishing accumulation of carbonaceous residue which results from the exposure to grease spatters at ordinary operating temperatures, can be effected by: applying to the substrate in intimate contact with each other an enameling composition comprising alkali-bearing glass frit particles, about ½ to 25% halide basis weight of said glass frit, and about 2–75 parts, per 100 parts of solids in said enameling composition, of particulate elemental metal selected from the group consisting of aluminum, magnesium, high alloys of either, and mixtures of the same; heating the resulting deposit in a heating zone until it forms, by interaction of the frit and the particulate metal, an integral, porous, sorptive surface structure containing crystalline devitrification products; then arresting said interaction in a cooling zone before substantial coalescence of the structure occurs. Cooking oven walls, fixed or removable panels, broiler pans and racks incorporating the resulting coated metal substrates can be made.

---

The term "self-cleaning" surfaces as used in the trade and herein refers to surfaces requiring a temperature of at least about 750° F. to accomplish a pyrolytic removal of accumulation of carbonaceous residues resulting from spatters from cooking food. The term "continuous cleaning" surfaces as used in the trade and herein refers to those surfaces when heated to 350–550° F. diminish and retard the accumulation of carbonaceous residues resulting from spatters, e.g., grease, from cooking food.

The earlier ovens or ranges of the self-cleaning type relied on pyrolysis for removing grease spatters from the surface of oven walls. The vaporized products then could be oxidized over a platinum screen. Very high temperature, long times, and noxious odors often were encountered. Later, continuous cleaning ovens, such as those disclosed in U.S. Pat. 3,266,477 were developed. The latter, often weak in abrasion resistance, incorporated strongly oxidizing catalysts such as platinum or oxides of chromium, manganese, nickel or the like in the oven by embedding such catalyst on the surface of the wall, suitably supporting it on such surface by means of a catalyst carrier such as alumina or silica.

Advantages of this invention over prior proposals include: continuous cleaning properties of high effectiveness for diminishing and retarding the accumulation of spatters on the surfaces at temperatures of from 350–550° F.; a surface resistant to at least modest abrasive action inherent when the surface is washed, wiped or scraped manually; a lower cost than similar devices having surface-embedded oxidizing catalysts; substantial impact resistance; useful single coatings; direct recoatability of defective parts without their scrapping; and no heavy metal compounds incorporated in the coating in a way which might produce toxicity or other undesirable effect.

One aspect of the invention is an improvement in the process for producing an adherent ceramic coating on a metal substrate used in food cooking apparatus, said coating having the property of diminishing the accumulation of carbonaceous residue which results from exposure to cooking grease spatters. More particularly, the improvement comprises:

(a) Applying to said substrate in intimate contact with each other an enameling composition comprising alkali-bearing glass frit particles, about ½ to 25% halide basis weight of said glass frit, and about 2 to 75 parts, per 100 parts of solids in said enameling composition, of particulate elemental metal selected from the group consisting of aluminum, magnesium, high alloys of either, and mixtures of the same;

(b) Heating the resulting deposit in a heating zone until it forms by interaction of said frit and particulate metal an integral, porous, sorptive surface structure containing crystalline devitrification products;

(c) Arresting said interaction in a cooling zone before substantial coalescence of said structure occurs.

Another aspect of this invention is an improvement in a cooking device having means for heating the cooking area, means for supporting food being cooked, and a wall at least partially enclosing said cooking area, said wall having an adherent ceramic coating thereon made as stated above.

Another aspect is an oven panel or wall surface made in accordance with the process set forth above.

Another aspect includes a broiler pan and cooking racks coated in accordance with the process set forth above.

Particular parts for the cooking apparatus contemplated herein include also interior oven surfaces, broiler racks, grills, trays, reflectors, burners, fitments such as trays, grids, cooking utensils and the like.

As is well known, cooking grease spatters often form carbonaceous deposits as the food is heated. These deposits are difficult to remove from the surfaces of parts in or on an oven by superficial washing or abrasion. Continuous cleaning parts contemplated by this invention which when heated to a temperature of about 350–550° F. provide for substantial apparent dissipation of such spatters or degradable carbonaceous products resulting. The mechanism by which the decomposition or dissipation takes place is not fully understood. The carbonaceous products might be chemically altered as by cracking into lower molecular weight compounds which volatilize in the surrounding vapor phase environment.

It is theorized that this porous, extended, sorptive surface generated by practice of the present invention prevents cooking grease spatters from baking into a varnish-like residue by preventing such spatters from coalescing during that stage of the heating cycle where probable polymerization and coalescence of the grease would normally occur on ordinary non-sorptive or less sorptive surfaces. It is known that cooking greases have relatively low vapor pressure and are not readily volatilized at ordinary food baking temperatures. Consequently, grease spatters, particularly those having carbon to carbon unsaturation, have a tendency to decompose and bake out to form varnish-like residues at these cooking temperatures rather than to volatilize. The present sorptive surface may act to prevent the coalescence of spatters at these cooking temperatures and, therefore, prevent the formation of such varnish-like residues. Additionally, the present sorptive surface can provide for improved vaporization efficiency of the grease through high surface exposure. The grease can then be more readily vaporized at relatively high temperatures without the attendant risk of forming a varnish-like carbonaceous residue.

The first 16 figures are photomicrographs of various views of the inventive coating actually mounted on steel substrates. FIGS. 5, 8, 11 and 14 are taken with direct light. FIGS. 1, 3, 6, 9, 12 and 15 are taken with oblique light. FIGS. 2, 4, 7, 10, 12, and 16 are cross sections of the coating on a steel substrate. In the photomicrographs elemental metal shows up as white irregular particles. The steel substrate in the cross section photomicrographs shows up as a light-colored material with apparent scratch marks. The mounting material above the cross section and the voids in the coating in all the views show up as the darkest irregular spots.

FIGS. 5, 6 and 7 are photomicrographs of the composition of Example 10 fired at 1380° F. for 4 minutes to give a good continuous cleaning surface.

FIGS. 14, 15 and 16 correspond to the views of FIGS. 5, 6 and 7 using the same composition as used in the FIGS. 11, 12 and 13, except that the firing was done at 1700° F. for 3 minutes. The continuous cleaning effectiveness of the resulting ceramic coating is still fair-to-good, but the coating is verging on being overfired. Note the smaller number of voids in FIG. 16 than in FIG. 13 and their larger character. The voids in the more effective coating (FIG. 13) are smaller and far more numerous throughout the coating.

Figure 1:
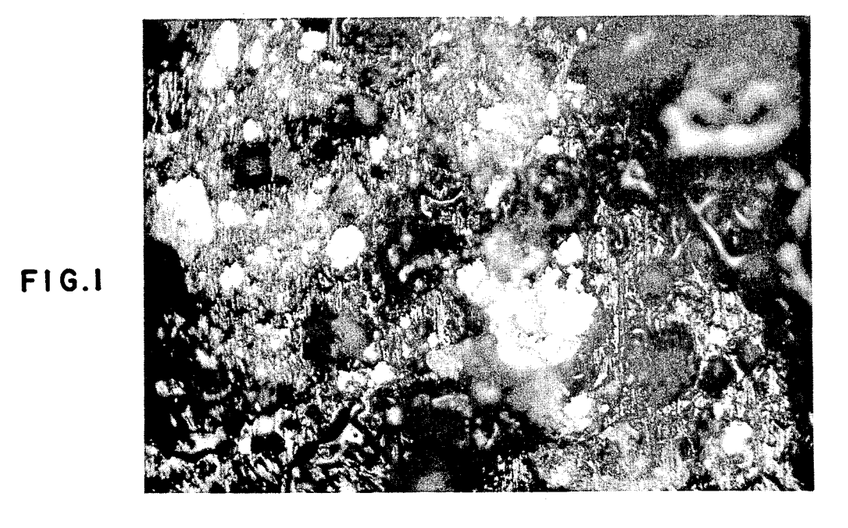
FIG. 1 is a photomicrograph at 340× magnification of a top view of a substrate steel panel lighted obliquely and having the adherent ceramic sorptive coating produced according to the method described in Example 6 to give an operable coating. The panel has been invested with a plastic mounting material to aid in microscopic analysis. The invested sample was then ground to a smooth surface. Between the mounting material and the substrate interconnecting the metal particles and surrounding the voids is the ceramic matrix material generated by the process. The solid particulate material used in forming this coating was of fineness such as that 18% thereof was retained on a 200 mesh Tyler Standard Sieve.
Figure 2:
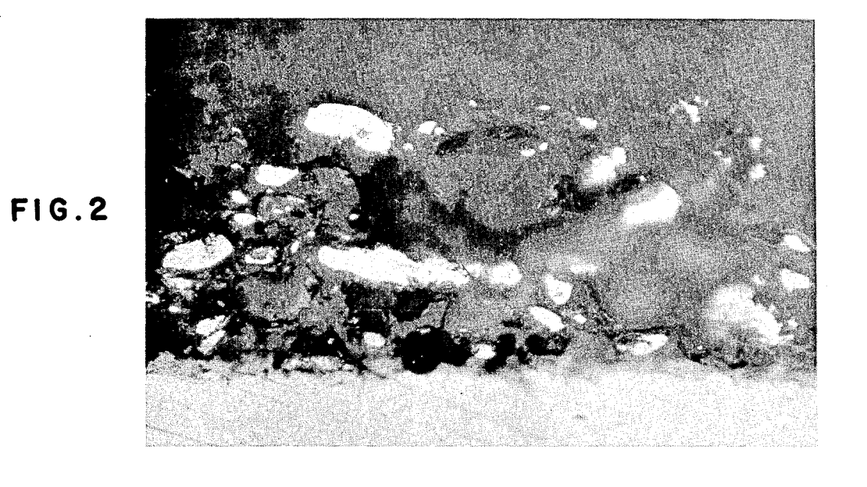
FIG. 2 is a photomicrograph at 610× magnification of a cross section of the substrate steel panel and coating shown in FIG. 1.
Figure 5:
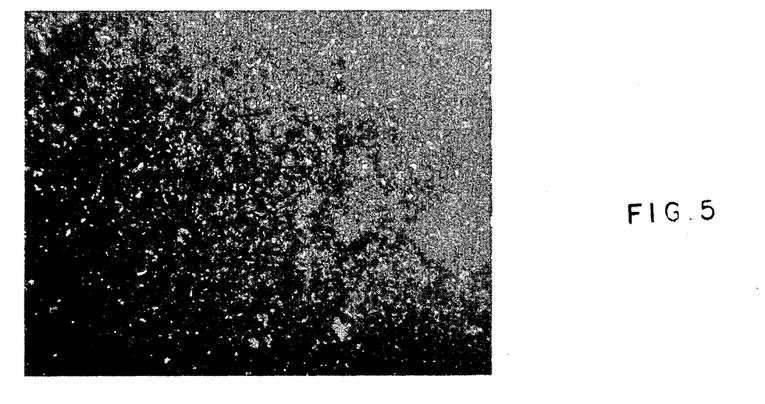
FIG. 5 is a direct shot at 100×.
Figure 6:
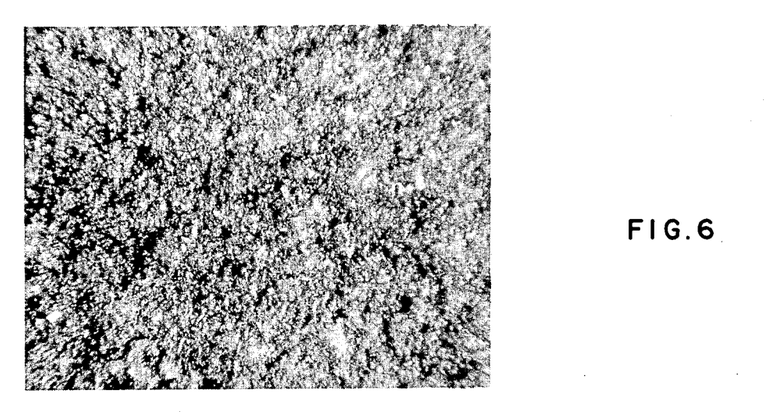
FIG. 6 is the same surface taken with oblique lighting at 100×.
Figure 7:
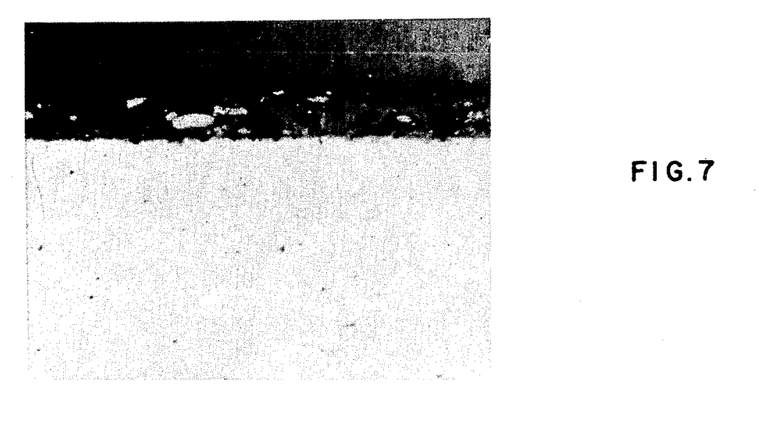
FIG. 7 is a cross section of the same surface at 200× magnification.
Figure 8:
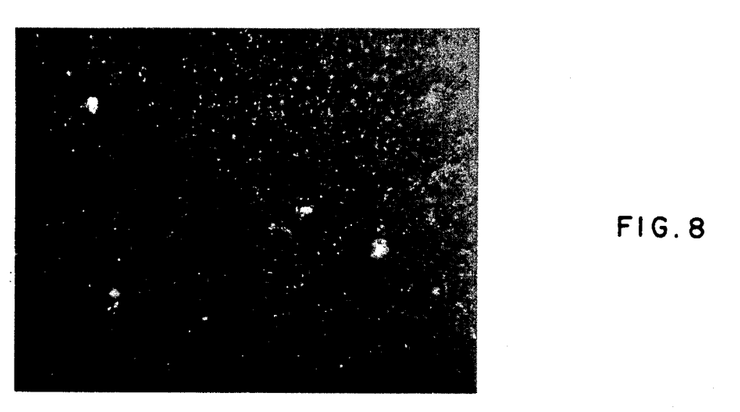
FIGS. 8, 9 and 10 correspond to FIGS. 5, 6 and 7 using the coating of Example 10, except that it was fired at 1480° F. and for 4 minutes. The resulting coating was very poor in continuous cleaning efficiency. It was definitely overfired. Note that there are many more voids in the coating shown in FIG. 7 than in FIG. 10, the coating of FIG. 10 apparently having coalesced substantially and expelled the void space.
Figure 9:
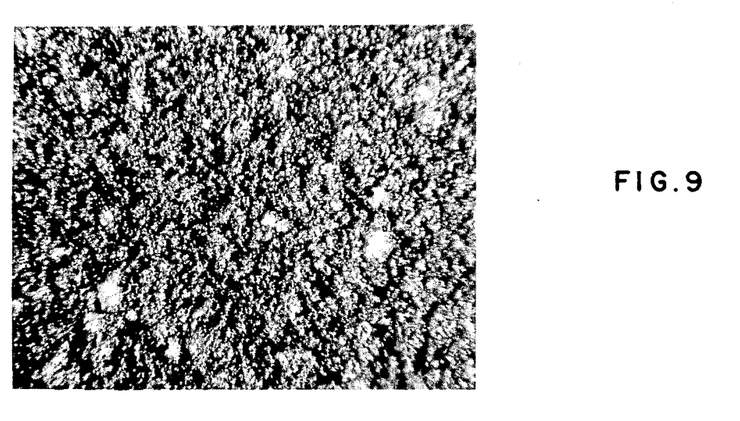
Figure 10:
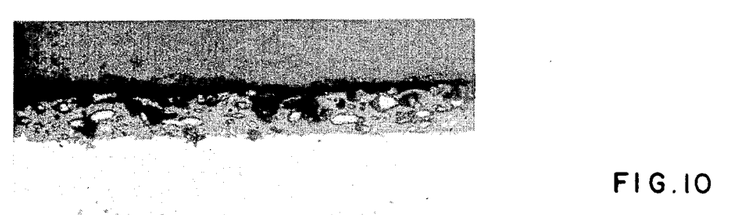
Figure 11:
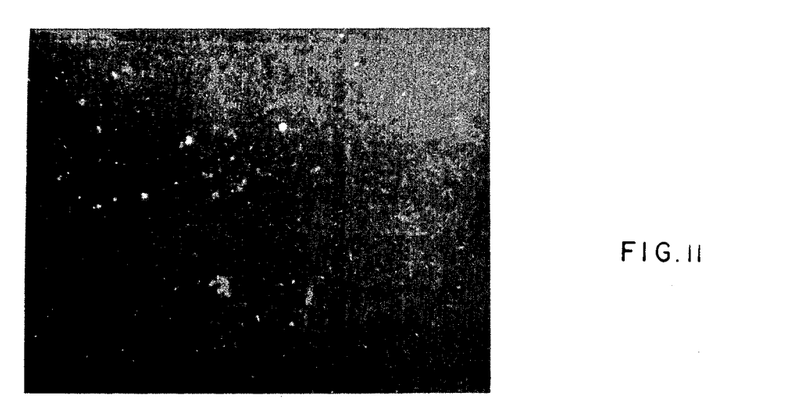
FIGS. 11, 12 and 13 correspond to views of FIGS. 5, 6 and 7, except that the coating composition used was that of Example 5 fired at 1500° F. for 3 minutes. This coating is one of the very best tested to date for the continuous cleaning purpose.
Figure 12:
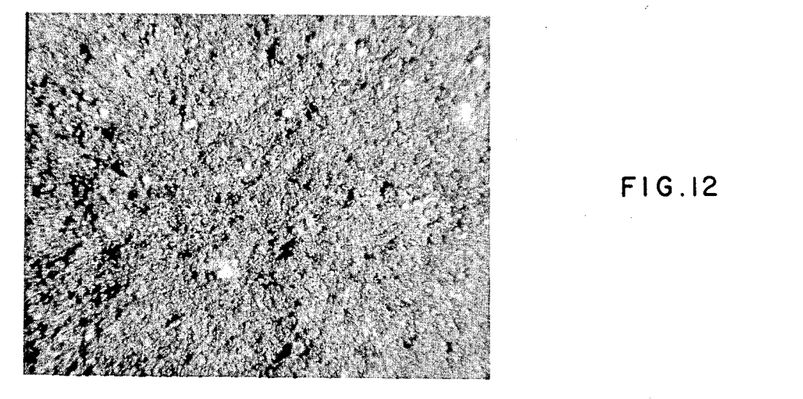
Figure 13:
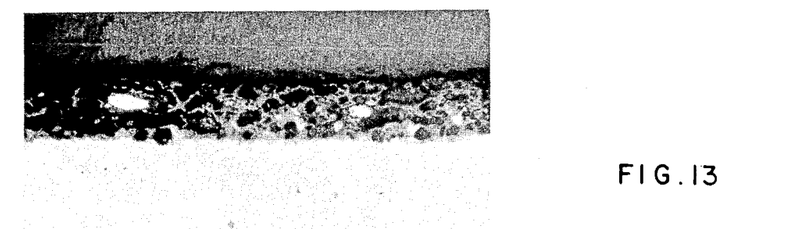
Figure 14:
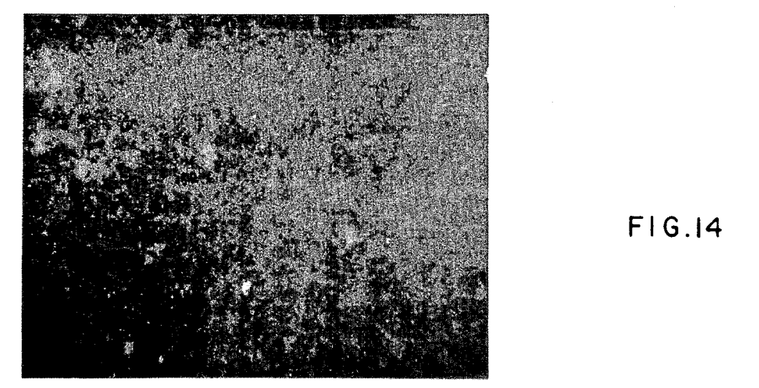
Figure 15:
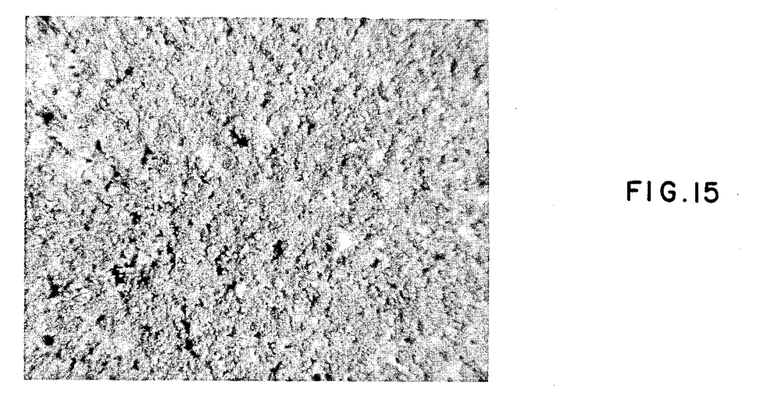
Figure 16:
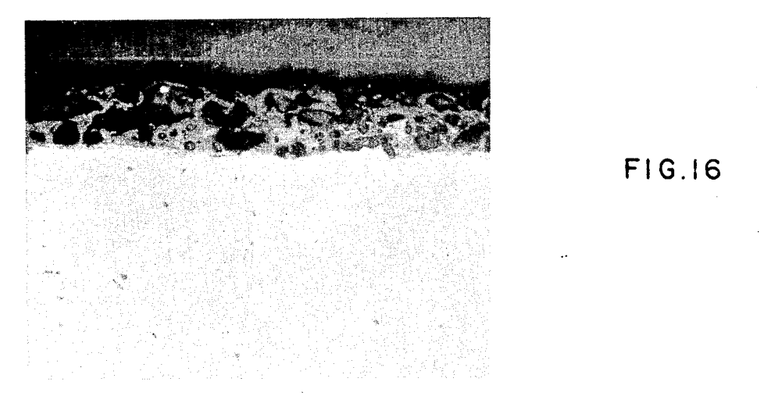
Figure 17:
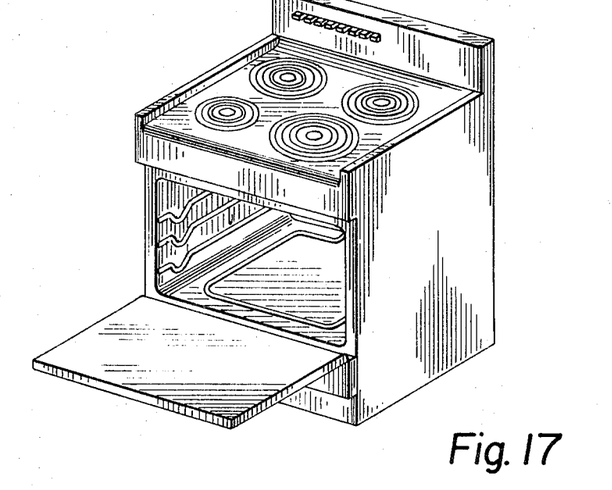
FIG. 17 is a pictorial representation of a cooking range with an oven, the oven walls and inner wall of the door being coated with the ceramic coating of Example 5.
Figure 18:
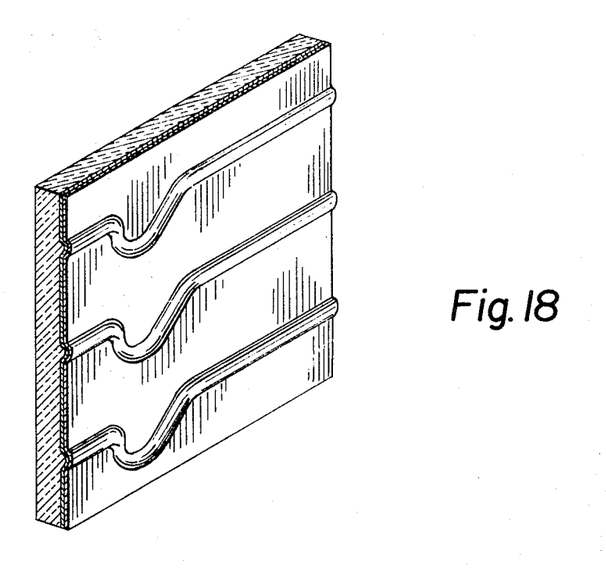
FIG. 18 is a view of an oven wall panel of FIG. 17, having the coating of Example 5 and showing the ridges which form supports for oven racks.

Summarizing the first 16 drawings, the following conclusions can be drawn. FIGS. 1 and 2 show a serviceable coating of fair-to-good effectiveness, but less effective than the coating shown in FIGS. 3 and 4 wherein the batch was ground to a much finer state of subdivision to undergo initially what appears to be a solid state reaction. FIGS. 5, 6 and 7 represent a serviceable coating of good effectiveness that has been heat reacted properly, whereas FIGS. 8, 9 and 10 represent the same coating overfired and its effectiveness for continuous cleaning is substanstantially destroyed. FIGS. 11, 12 and 13 show an excellent coating for the continuous cleaning purpose, the firing being approximately optimum for this particular material. FIGS. 14, 15 and 16 show how the same coating can be slightly overfired and lose some measure of its effectiveness and border on becoming marginal. Firing this coating up to 1900° F. for 4 minutes substantially destroys its continuous cleaning effectiveness.

Overfiring results in some collapse of at least the high points on the porous surface (a type of fire polishing, as it were) and gradual coalescene of the matrix phase of the coating; the coalescence and gradual elimination of voids gets more pronounced as the severity of the overfiring increases. A good share of the porous structure is eliminated or collapsed. Furthermore, there is a pronounced coalescence or clumping of particulate matter when the surface is viewed under an optical microscope. Thus, a highly effective coating will have under the microscope its various bodies of grey, black and light color fairly evenly dispersed. As this same coating is more highly fired, the particles of grey appear to coalesce or become more agglomerate, leaving isolated bodies of black and a lighter background more in evidence, even at magnifications of 100×.

In general there is a definite darkening reaction which occurs as the elemental metal reacts with the frit in the presence of the halide component. For a given composition in many cases the darkest color corresponds generally with the most effective heat reaction, but this is not always accurate with every type of composition.

Every useful frit has a transformation or transition range which can be determined by plotting on the vertical axis the linear expansion of the glass ascending and on the horizontal axis the temperatures increasing to the right. There results an approximately straight line from the intersection of the axis up to a slight inflection point which has been called the "equivalent rate temperature" (Andrews, Porcelain Enamels, second edition, page 59, Girard Press, Champaign, Ill., 1961). At this point the linear expansion increases more rapidly in response to increase in temperature to a maximum where further increase in temperature results in a drop off in linear expansion. This second inflection point is called by the same Andrews text, page 59, as the "fusion temperature." Other authorities have different names for these two points. Thus, Volf in his text Technical Glasses (Sir Isaac Pitman & Sons Ltd., London, 1961) calls the lower point the "lower annealing temperature" and the upper point the "incipient deformation point." This incipient deformation point corresponds approximately to a log viscosity of about 8. The incipient deformation temperature can be determined by ASTM Test Method C–539–66—Linear Thermal Expansion of Porcelain Enamel Frits by the Interferometer Method. The range between these two temperatures is called the "transformation or transition range." Above the incipient deformation point the elemental metal begins to react noticeably with the frit for my purpose, and sintering usually is evident, along with gradual darkening. At this point continuous cleaning effectiveness can be fair, but the coating is soft. The cleaning effectiveness drops slightly as heat reaction passes this point, then increases as the coating is fired harder. Studies thus far have indicated that the useful frits (glasses) have a point of incipient deformation not substantially above about 1265° F., advantageously 700–1200° F., and preferably 770–930° F.

Now, from the experimental work on this invention it has been found that the most effective continuous cleaning surfaces made in accordance herewith are those in which the temperature range between the incipient deformation point and the optimum firing temperature is passed through during firing in less than about 7 minutes, advantageously in less than about 5 minutes, and preferably in about 2 minutes or less. Having passed through this range (between the incipient deformation point and the optimum firing temperature), the heat reaction (in the nature of a "soak") between the elemental metal particles and the frit is continued for not more than about 6 minutes, advantageously about ½ to 5 minutes, and preferably about 1½ to 2 minutes, at the optimum firing temperature. About 10 minutes of reaction above the incipient deformation point is generally too long and results in too much collapse or coalescence of the porous structure to make a truly useful continuous cleaning ceramic surface.

Crystalline devitrification products in the finished coating have been observed by X-ray diffraction, e.g., with aluminum as the elemental metal there appears alumina, sodium aluminum silicate, and other crystalline phases that have not yet been identified. The heating (firing) can be adjusted for a particular composition or for a particular plant facility by using a more refractory or less refractory frit, a change in line speed, and/or an adjustment in firing temperature. The chemical and physical interaction resulting from flow of glass, void formation, and generation of new crystalline phases is understandably complex. The reaction is arrested by a cooling, most simply by removing the coated metal substrate from the firing zone into a room temperature air zone and allowing the heated piece to cool to room temperature. Other cooling or "quenching" can be done with forced gases as necessary or desirable.

For a given composition to elemental metal will gradually decrease on the surface as measured by X-ray diffraction when identical samples are fired for the same time (e.g., 3 minutes total) but at increasing temperature. The light color of the elemental metal is very pronounced initially in the coating. Probable oxide interference prevents accurate measurement of the metal if firing is arrested very early in the temperature range between the incipient deformation point and the optimum firing temperature, and the coating, while fair-to-good for continuous cleaning purposes, often is somewhat soft and, therefore, less desirable than coatings having harder firing.

A typical coating such as that shown in Example 5 when fired at 3 minutes and 1300° F. on a sheet steel substrate continuously cleans itself well, but is still soft. At 1350° F. darkening of the coating is apparent and the Mohs hardness is about 4. At 1400° F. and the same time of firing the Mohs hardness is between 5 and 6, and the coating is getting definitely dark. At 1500° F. the typical Mohs hardness is between 8 and 9 and the firing is optimum. Of course, this surface is quite porous and rough in texture, and is quite dissimilar from the smooth continuous surface normally evaluated by the Mohs hardness test. Correlatively, the elemental metal content in the surface (as measured by X-ray diffraction) has dropped markedly from the same material fired at 1300° F. for 3 minutes. From thereon successive samples fired at 1600° F., 1700° F. and 1800 F. for 3 minutes have about the same Mohs hardness, and usually visually are gradually slightly lighter than the deepest color of the 1500° F. sample. Their continuous cleaning effectivness gradually falls off with ascending firing temperature, the 1800° F. fire being considered workable but marginal and far less desirable than the 1500° F. firing. When the same kind of sample is fired at 1900° F. for 3 minutes, the hardness possibly is a little higher, the elemental metal in the surface as measured by X-ray diffraction decreased, and fat deposits are not very effectively removed, but rather leave a varnish-like deposit which glazes over the surface and is very difficult to remove.

In general it can be said that most compositions are fired within that fairly narrow range of conditions for which one would fire the corresponding frit directly on a sheet metal substrate in the absence of elemental metal to obtain its maturation, that is to form a film and to develop optimum properties of chemical resistance, hardness of surface finish, and the like. Thus in such conventional firing directly on metal substrate there is developed in a ground coat a desirable microbubble structure, and such ground coat is considered by those skilled in the art to be overfired if this microbubble structure is lacking or not strongly evident. This maturing temperature or optimum firing temperature range for the present invention, as a rule of thumb, then can be said to be at the maturation optimum for the frit generally plus or minus as much as about 200° F. This is usually in the range of about 400° F. to 700° F. above the incipient deformation point.

Perhaps the very best test of the effectiveness of the coating and its firing for continuous cleaning purposes is this one: a coated steel plate (20 gauge steel with about 15 grams per square foot of fired coating in a single deposit direct on the steel or on a previously-applied porcelain enamel ground coat) is preheated to 375° F.; a deposit of refined corn oil is applied by brush at about 15 milligrams per square centimeter; the plate then is returned to a heating zone and heated for one hour at 375° F., then the temperature is raised to 525° F. while the heating is continued for an additional 2 hours. A superior continuous cleaning surface leaves no residue other than at the most a slight stain which it virtually indistinguishable from a dark coating. A fair coating has a much more visually pronounced residue, but is still not covered with varnish and the residue will be baked off in time. The poor coating will have glossy deposits where the corn oil was placed, and this is visible to the naked eye by looking obliquely at the surface. This simple test serves to identify the operational effectivness of the inventive process.

The particulate metal to be used in forming the adherent ceramic coating is in its elemental form as distinguished from its oxide or other chemical combinations and is in a finely divided state, e.g., flake or powder. The metals suitable for practicing the invention are selected from the group consisting of aluminum, magnesium, high alloys of either, and mixtures of the foregoing. High alloys are the alloys of aluminum or magnesium that have at least a major weight fraction of aluminum or magnesium. The aluminum can be alloyed with magnesium. Examples of elements suitable for alloying with aluminum or magnesium are silicon, zinc, nickel, iron, maganese, chromium, copper and cobalt. Typical aluminum nad magnesium high alloys can be found in the third edition of Perry's Chemical Engineering Handbook published by McGraw-Hill Book Company, Inc., 1950, pages 1527, 1529 and 1531. In addition mixtures of the two metals and/or such alloys can be used. For reasons of efficiency, the unalloyed metal, particularly aluminum, is preferred for achieving the continuous cleaning coatings described.

For best performance, the elemental metal or alloy particulates pass at least a 60 mesh Tyler Standard Sieve. Usually such metal or alloy is in the form of a flake or an atomized powder. While larger particles can be used in forming the deposit, the continuous cleaning effectiveness of the resultant coating is often reduced. Furthermore, if a slip is formed prior to deposition on the substrate, large particles create problems in stability of the slip and its handling characteristics. Particle size of the elemental metal is not as critical to the effectiveness of the resultant continuous cleaning coating as is the frit particle size because firing is normally conducted at a temperature above the melting point of the elemental metal. Preferably, however, the metal particles are sufficiently fine to pass 95% through a 270 mesh sieve, or even better 325 mesh sieve (Tyler Standard).

In forming a coating having practical continuous cleaning properties, at least about 2 parts elemental metal per 100 parts of solids or non-volatile material in said enameling composition is used in forming the coating deposit prior to firing. When less than this is used, there appears to be insufficient reaction during firing to make an adequately porous, sorptive surface. The frit then tends to glaze or fill in many voids created in the surface, and the effectiveness of the coating for continuous cleaning purposes can be greatly diminished. When the elemental metal exceeds about 75 parts per 100 parts of solids or non-volatile material in the enameling composition, the coating can become less adherent and it is not likely to be as practical or even as effective with respect to continuous cleaning properties as a coating produced with lesser amounts of the metal. If the deposit is made from an aqueous slip containing the metal, high percentages of metal also can create severe gassing problems in forming the slip, and the resultant slip often has undesirable spraying properties. Most efficient coating results can be obtained when the unfired deposit contains from about 15 parts to 35 parts metal per 100 parts solids in said enameling composition, thus that is preferred.

For reasons of efficiency and economy, aluminum metal is the preferred elemental metal for practicing the invention. It is lower in cost than most of the other mentioned useful particulate metals, it permits the formation of a coating with excellent continuous cleaning properties, and aluminum and its reaction products generally are substantially devoid of toxicity for food processing equipment. Suitably the aluminum or other particulate metal is in the form of a paste of finely-divided metal. When the metal is added as the stabilized paste form in the formation of an aqueous slip, inherent gassing resulting from reaction of metal and alkaline water is easier to control than when it is added to the slip in dry powder form. A paste which has been found preferable is sold under the trademark of "Hydropaste 830" by the Aluminum Company of America, and is a mixture comprising 70% aluminum flake by weight of the paste, 95% of the aluminum passing a 325 mesh sieve, volatile organic solvent, and stearic acid as a leafing agent. Stabilized aluminum pastes of this type are disclosed generally in U.S. Pats. 2,587,266; 2,587,267; 2,587,268; 3,244,542; and particularly 2,848,344; the disclosures of which are incorporated by reference.

The term "enameling composition" as used herein means the alkali-bearing glass frit conventionally produced by quenching, and thus breaking up molten glassy materials, and it also includes, if needed, the usual and conventional porcelain enameling mill additives for its deposition on the surface of prepared enameling metal, or on such metal already coated with a previous coating of the type described herein, or on an ordinary porcelain enamel coating as a previous ground coat.

A slip is one type of enameling composition and refers to the dispersion, slurry, paste or spreadable or sprayable mixture of frit suspended in a volatile liquid vehicle. A dry process enameling composition is one that is sprinkled as particulates directly onto hot substrate.

When preparing the slip, the usual mill additives such as refractory oxides, clays, stains, binders, surfactants, thickener, gums, suspending and peptizing agents, resinous and other organic additives, etc. can be used to attain desirable stability and consistency for application, and improved adherence for deposition onto the metal substrate. Advantageously for the instant purpose the weight percentage of such refractory oxides and other mill additives (other than halides) comprises less than about 15% by weight and preferably less than about 10% by weight of the solids or non-volatile fraction of slip, the most preferably not more than about 5%.

The solids or non-volatile content of the enameling composition as used herein refers to that fraction of the enameling composition which remains in the deposit after customary drying to remove free vehicle. By difference a substantial portion of the non-volatile material in the slip is frit, that is the alkali-bearing glass particles. Ordinarily the percentage of the frit in the slip exceeds 30%, generally is in the range of 40–80%, and preferably is from about 55–75% by weight of the non-volatile or solids fraction or even higher.

It is essential to the development of good continuous cleaning properties that the enameling composition is in intimate contact with a source of halide in a proportion of at least about ½% and up to about 25% measured as the halogen element basis weight of the glass frit. Preferably for intimate contact the halide is smelted into the frit; otherwise it can be added to the enameling composition as a mill additive; alternatively, it can be supplied from a ground coat that liberates the halide on firing. The most active halide for the interaction here is a fluoride, with declining continuous cleaning efficiency noted when chlorine, bromine, and iodine are substituted for fluorine in that order. For practical operation and activity the halide in the enameling composition should be fluoride in a major part. It is difficult and usually wasteful to attempt to put in more than about 25% (basis weight of the glass particles) in a frit composition and can even detract from the desired cleaning ability. The preferred halide is entirely fluoride smelted into the glass and amounting to about 3–4% by weight of the glass frit.

The halide can be smelted into the frit by addition of fluorspar, sodium silicofluoride, cryolite, sodium fluoride or other alkali metal halide. Preferably, the halide is so smelted into the frit for best control of the composition. The fluoride particularly, and the halides generally, appear to cause the desirable interaction between the metal particles and the frit.

Optionally, however, the halide can be incorporated into the enameling composition as a mill addition by adding fluorspar, alkali metal chloride, etc. to the frit praparatory to its grinding. Halides other than fluoride are difficult to smelt into the frit.

The useful glass frits for the present purpose generally are of two basic types, alkali borosilicates and alkali alumino phosphates. Alkali metal oxide, especially sodium and/or lithium oxides appear to be necessary ingredients. Broadly the alkali borosilicates contain approximately 25–65 weight percent $SiO_2$, 10–25% $R_2O$ (alkali metal, including lithium oxide and preferably containing some sodium oxide for effectiveness and economy), 2–20% $B_2O_3$, and 5–40% modifiers, the modifiers typically being alkaline earth and/or Group II–B metal oxides such as magnesia, calcia, strontia, baria, zinc oxide, etc. Additionally, very small proportions of adhesion-promoting oxides (e.g., cobalt oxide), coloring oxides (e.g., manganese oxide, cobalt oxide, iron oxide, etc.), and opacifying oxides can also be present as in conventional frits.

Broadly, the alkali alumino phosphates will have analyses as follows: 10–50% by weight $P_2O_5$, 2–30% alkali metal oxide ($R_2O$), 10–35% $Al_2O_3$, and 10–30% modifiers, the modifiers being typically $B_2O_3$, $SiO_2$, and $TiO_2$. Adhesion-promoting, coloring and opacifying oxides also can be present, as above. For compounding the glass batch for making the frit, the customary techniques prevail, silica being provided for by such minerals as quartzite ground to finer than 200 mesh, alkali metal silico fluorides, and zirconia, $B_2O_3$ being provided by borax, boric acid, or rasorite, $P_2O_5$ being supplied by sodium tripolyphosphates, alkali and alkaline earth being supplied by carbonate, fluorides, nitrates and the various minerals used in the batch, alumina being supplied directly from the oxide, from feldspar, and/or from cryolite, zirconia being provided by milled zircon, titania being provided as an oxide or rutile ore, and fluoride and other halides being supplied as discussed hereinbefore.

The best frits for continuous cleaning have in the frit combined sodium oxide and/or lithium oxide, the lithium oxide probably lowering the optimum firing temperature when substituted for some or all sodium oxide. When potassium oxide is used to replace all the sodium oxides or lithium oxide, the resulting effect on continuous cleaning appears to be somewhat detrimental. Substitution of some $B_2O_3$ for silica appears to enhance continuous cleaning properties. Adjustments in the alkaline earth or Group II-B metal oxide content do not seem to make a great deal of difference on the continuous cleaning property. Adhesion and coloring oxides such as cobalt, manganese, and the like can be used, as has been customary in ground coat practice for many years. However, their removal from the enameling composition either as mill additives or from the glass does not appear to affect the continuous cleaning properties of the resulting coatings. However, some loss of adhesion has been noticed when the customary small percentage of cobalt used in conventional ground coat frits has been left out. Refractory oxides such as titania, zirconia, clays, silica, zircon, alumina, and calcium zirconate added as mill additions to the frit composition can function to extend the firing range somewhat, but are preferred for efficiency and economy to not exceed about 5% of the dry weight of the frit for most effective use.

Compositional experience to date with useful alkali borosilicate frits can be summarized in the following table. Minimum, practical maximum, and preferred weight proportions of the various oxides and elements of the frits useful in compounding to date continuous cleaning coatings of the instant type (which did not leave appreciable varnish-like deposits in tests) is as follows:

|  | Minimum | Maximum | Preferred |
|---|---|---|---|
| $SiO_2$ | 24 | 66 | 42 |
| $B_2O_3$ | 2 | 23 | 8 |
| $Na_2O$ | 3 | 20 | 18 |
| F | 0 | 20 | 3.5 |
| $Co_3O_4$ | 0 | 1 | 1 |
| $Al_2O_3$ | 0 | 10 | 0.5 |
| $ZrO_2$ | 0 | 15 | 15 |
| CaO | 0 | 10 | 3 |
| BaO | 0 | 14 | 0.7 |
| $TiO_2$ | 0 | 21 | 3 |
| ZnO | 0 | 29 | 2 |
| $Li_2O$ | 0 | 6 | 2 |
| $V_2O_5$ | 0 | 0.2 |  |
| $MoO_3$ | 0 | 4 |  |
| $K_2O$ | 0 | 22 |  |
| MgO | 0 | 1 |  |
| SrO | 0 | 0.2 |  |
| PbO | 0 | 17 |  |
| NiO | 0 | 2 |  |
| CuO | 0 | 0.5 |  |
| $MnO_2$ | 0 | 2 |  |
| $P_2O_5$ | 0 | 3 |  |
| CdO | 0 | 2.5 |  |
| $Sb_2O_3$ | 0 | 2 |  |
| $Fe_2O_3$ | 0 | 0.2 |  |
| $As_2O_3$ | 0 |  |  |
| Cl | 0 |  |  |
| I | 0 |  |  |
| Br | 0 |  |  |
| $Cr_2O_3$ | 0 |  |  |
| SnO | 0 |  |  |

It will be obvious to one skilled in the art that chlorine, bromine, and iodine cannot be very easily smelted into a frit as fluorine. Accordingly, these can be added as mill additions of metal halides. It is also apparent that certain materials, while they can be used in the frit, would not necessarily be used because of their undesirable nature in connection with food processing such as lead, arsenic, and other optional materials.

The frit generally is ground to at least about 95% passing 200 mesh (Tyler Sieve) and preferably for good continuous cleaning performance and manufacturing efficiency no more than about 0.2% retained on 325 mesh. The grinding of the frit is done in a ball mill and the particulate elemental metal can then be mixed together with a ground frit in a low shear blunger such as a pony mill or agitated tank which is vented to the atmosphere. In general the finer the grind, the better the continuous cleaning performance, but curiously when a grind having all frit finer than 400 mesh was tested, some decline in performance has been observed in some cases.

In preparing the sorptive coating, a bisque coat is deposited on the substrate, said coat comprising an enameling composition containing the halide agent (either in the glass frit or as a mill additive or supplied by an undercoat as hereinafter described), and from 2 to 75 parts of the elemental metal per 100 parts of solids in the enameling composition. The enameling composition can be applied dry, or it can be applied as a slip containing volatile liquid vehicle.

One method of depositing a coating by the dry technique is to mix the enameling composition, add metal to form an intimate powdered admixture and distribute it over and onto the substrate. Such mixing of the frit composition and metal to form the admixture should be done in a fairly inert environment to prevent substantial oxidation of the elemental metal. However, adequate results can be achieved if the mixing, application of the admixture to the substrate, and firing are accomplished quickly. A second method is to apply a first layer of powdered aluminum metal to the substrate followed by a layer of the enameling composition. Blistering of the coating often can occur during firing if the aluminum is put on after the enameling composition has been applied. Because of such blistering, this latter method is less advantageous for aesthetic as well as practical reasons.

The preferred method of depositing a coat on a substrate is to co-deposit from an aqueous slip comprising volatile liquid vehicle, non-volatile materials or solids content including the frit (containing halide agent) and the particulate elemental metal (and usually fugitive binders, suspending agents, thickeners and other conventional mill additives). Co-deposition is preferred because it provides for intimate admixing the frit and elemental metal and without substantial conversion of the metal to its oxide. Slips are usually formed by mixing the vehicle, frit suspending agents, mill additives and particulate elemental metal in equipment such as a pony mill, agitated tank type or equivalent low shear blunger.

By volatile liquid vehicle it is meant a liquid which provides a medium for dispersing the frit and particulate elemental metal and is fugitive at a normal drying temperature up to several hundred degrees Fahrenheit. For reasons of efficiency and economy, water is the preferred vehicle. Additionally, somewhat better continuous cleaning coatings seem to be generated when using water than when using organic vehicles. However, other useful volatile liquid vehicles including lower aliphatic alcohols, ketones, alcohols, ketones, alkyl esters of aliphatic alcohols, aliphatic and aromatic hydrocarbon solvents such as xylol, toluene, benzene, heptane, decane and the like, can be used. The ratio of volatile vehicle to non-volatile material in the slip composition generally can be from 0.5:1 to about 10:1. Lower and higher ratios of vehicle to non-volatile materials usually cause difficulty in applying the slip to the substrate. Therefore, the proportion of vehicle to non-volatile or solid material is generally regulated to provide a slip having desirable spraying or dipping characteristics.

Another technique for depositing an enameling composition on the substrate is to apply as a first layer a ground coat of a slip containing a frit without the elemental metal particles, but with the halide, to the substrate, then applying an enameling composition cover coat of slip composition containing a second frit having little or no halide agent therein, but elemental metal in the prescribed amounts, over the ground coat. The halide in the ground coat appears to diffuse adequately into the cover coat upon firing to assist the reaction between the glass and the elemental metal. A ground coat is a porcelain enamel applied directly to the substrate metal to function as an intermediate layer between the metal and the cover coat. A cover coat refers to a coating applied over a ground coat or undercoat.

After the coating is deposited on the substrate, it ordinarily is dried prior to firing. Drying of the slip deposit is usually conducted at atmospheric pressure and at a temperature up to about 350° F. Drying should be accomplished in a relatively short time to suppress oxidation of the elemental metal. The idea is to remove the volatile liquid vehicle prior to firing, but without causing substantial reaction of elemental aluminum and water present, or causing the coat to flake or otherwise fall off the substrate. Wet coatings are more difficult to fire properly than dry coatings. Therefore, the step of drying is done for efficiency.

The ostensibly dry coating is converted to an adherent ceramic coating having continuous cleaning properties by heating the resulting deposit comprising frit composition and particulate elemental metal as discussed above.

One way of viewing the firing process is that firing is conducted at a temperature and for a time sufficient to form the integral, porous, sorptive surface, but insufficient for substantial and progressive reduction in porosity and ultimate fusion of the resulting complex ceramic composition as a result of the heat treatment. When the coating is overfired, the matrix tends to collapse, become glossy at peaks, and the effectiveness of the coating with respect to continuous cleaning properties diminishes rapidly with the degree of overfiring. Under-firing by conducting the firing at too low a temperature or too short a time does not generate a sufficient reaction between the frit and elemental metal to form a reasonably hard (e.g. Mohs 4+), porous, sorptive surface. Optimally for best results, firing is conducted at a temperature and for a time in which the deposit forms its normally strong adherent bond to the metal substrate, and the elemental metal/glass interaction occurs to generate the highly porous structure. Firing ordinarily is done in air, but fairly successful firings also can be done where most or virtually all of the oxygen is absent.

During firing, it is believed that a reaction, activated by halogen, takes place between the elemental metal and the glass, presumably with some water or hydroxyl groups adsorbed thereon, to generate gaseous materials which are evolved. The gases generated created minute pores, voids, fissures, crevices, and the like, forming a porous matrix in the ceramic coating. In addition, surface projections are generated providing increased surface area. Effectiveness of the coating with respect to continuous cleaning properties appears to be dependent on the very high surface area, both external and internal, generated during firing and preserved thereafter by cooling. The porous and vesicular structure of the fired coating tends to deform the collapse causing decreased surface area and porosity when the coating is over-fired.

To illustrate this, a frit composition practically identical to the composition as set forth in column 2, lines 14–22 of U.S. Pat. 2,898,253, was mixed with 25% aluminum flake, the mixture was coated onto steel sheet, and three samples, respectively, were fired at a temperature and for a time of 1700° for 30 minutes, of 1480° for 4 minutes, and of 1380° for 4 minutes. The continuous cleaning effectiveness of the coating was nill in the first instance, poor in the second, and good in the third while the gloss of the fired coatings decreased in that order. Thus, while overfiring appears to have been desired for such materials in accordance with prior suggestions, the danger of overfiring and the modest temperature increases causing overfire is manifest for the instant purpose. Other examples hereinafter show that a modest reduction in the firing temperature and duration of firing often produces a much better coating for continuous cleaning cooking surfaces where a particular mixture of enameling composition and metal powder is being used.

Generally, the useful finished coating can be formed by firing at the normal temperature and time that would be used for optimally maturing the particular frit used if the elemental metal were not present. For the frits best suited for this invention, firing is normally conducted at temperatures of from slightly above the sintering temperature of the composition (850°–1400° depending on the viscosity-temperature relationship of the glass composition) up to about 1700° F. Usually this optimum firing temperature is in the range of 400–700° F. above the incipient deformation point. When using a frit having the indicated analysis as set forth in Example 1, firing temperatures between about 1300° F. and about 1600° F. and firing durations between about 2½ and not more than about 20 minutes are in order. Preferably, such firing temperature is between 1400° F. and 1500° F. for a period of about 3 to 8 minutes.

An additional aspect on firing is that the best coatings for exhibiting continuous cleaning properties are produced when heat-up on firing is conducted rapidly. This aspect is shown in Example 7. When a muffle-type furnace is used for firing, the thickness of the metal substrate having heat capacities similar to steel should not exceed about ⅜ of an inch and preferably should be less than 3⁄16 of an inch. Thicker metal substrates have a slower heat-up rate in the muffle-type furnace and often produce coatings which are of low usefulness as continuous cleaning coatings. However, thick sections which are heated or preheated very rapidly, as by electrical induction, can be used to produce effective continuous cleaning properties. Common sheet metal (steel, aluminum, copper, etc.) for household appliances, such as ovens, broiler pans, and the like, are about 16 to 22 B & S gauge, and preferably 20 gauge, in thickness; such thickness is preferred for practicing this invention. These metals are prepared for enameling in the conventional manner for best adhesion between enamel and substrate. For instance, steel is often cleaned, pickled, and given a flash of nickel for best adherence to ground coats or porcelain enamel.

About a 4 mil fired thickness is preferred in the fired top or single ceramic coat for the instant purpose. This amounts to roughly 15 grams per square foot. A fired coating less than about 5 grams per square foot on bare metal usually permits metal oxide (e.g. iron) to blush through, whereas a fired coating of more than about 25 grams per square foot often exhibits spontaneous spalling. To obtain thicker coatings one can use successive applications and firings of the resulting deposit in accordance with invention principles, e.g. obtaining about 12 mils thickness in three successive applications and firings without spalling from gas formation.

The following examples show ways in which the invention has been practiced, but should not be construed as limiting the invention. All temperatures herein are in degree Fahrenheit, and all percentages are by weight unless otherwise specified. All parts are parts by weight.

EXAMPLE 1

A preferred frit to be used in forming the coating was prepared by smelting the materials, set forth in Table A, at a temperature of 2150° F. Table B represents the calculated oxide composition for the frit. After smelting, the total weight of the batch was 1556 parts.

TABLE A

| | Parts |
|---|---|
| Silica | 520 |
| Soda ash | 328 |
| Fluorspar | 60 |
| Zinc oxide | 26 |
| Sodium silicofluoride | 105 |
| Lithium carbonate | 90 |
| Zirconium silicate | 364 |
| Barium carbonate | 15 |
| Rasorite | 195 |
| Rutile | 53 |
| Cobalt oxide | 17 |
| | 1773 |

TABLE B.—OXIDE COMPOSITION

|  | Wt., percent composition | Mole, percent composition |
| --- | --- | --- |
| Na$_2$O | 17.87 | 18.61 |
| CaO | 2.75 | 3.16 |
| Fluorine | 3.77 | 6.41 |
| B$_2$O$_3$ | 8.02 | 7.43 |
| SiO$_2$ | 42.56 | 45.75 |
| Al$_2$O$_3$ | 0.40 | 0.25 |
| MgO | 0.08 | 0.14 |
| ZnO | 1.64 | 1.29 |
| Li$_2$O | 2.29 | 4.96 |
| ZrO$_2$ | 15.49 | 8.12 |
| BaO | 0.74 | 0.31 |
| CoO | 1.02 | 0.88 |
| TiO$_2$ | 3.27 | 2.64 |
| V$_2$O$_5$ | 0.03 | 0.01 |

The frit prepared after smelting was pre-milled in a ball mill so that substantially all of the frit would pass a 325 mesh screen (Tyler Standard). The frit had an incipient deformation point of about 850° F.–900° F.

EXAMPLE 2

A slip was formed by mixing 1,000 parts of the frit prepared in Example 1 with 70 parts of a conventional porcelain enameling clay, 50 parts finely divided silica having a particle size about 325 mesh (Tyler Standard), 3.75 parts hydrated borax, 1.25 parts of a bentonite clay, 1.25 parts magnesium carbonate, 0.6 part sodium nitrite and 483 parts of water. These materials were charged to a ball mill and ground for 1½ hours to form a slip.

One hundred and four parts of this slip, having about 80 parts of non-volatile material therein were blended with 20 parts of an atomized elemental aluminum powder having a particle size finer than 200 mesh Tyler Standard and milled in a vented ball mill to produce a coating slip. The resulting coating slip was sprayed onto a 20-gauge steel substrate, conventionally prepared for porcelain enameling, in the proportion of about 15 grams of dry solids per square foot (about 35 grams wet) of substrate. The coated substrate was dried at about 300° F. for about 10 minutes until most of the surface water had been removed from the coating. There was no apparent reaction of the elemental aluminum metal with the atmosphere during drying. The coated substrate, then, was fired in the presence of air in a muffle furnace at a temperature of about 1480° F. for 4 minutes, removed and cooled in a cooling zone to room temperature. It is estimated that heat-up of the coated substrate from room temperature to firing temperature took approximately 1 minute. It is also estimated that the frit at the firing temperature was held for another 3 minutes soaking time. This is the time during which the sorptive surface is optimally generated by the interaction of aluminum and frit and formed. Approximately 15 seconds, or maybe even less, after the removal of the coated substrate from the muffle furnace to air (70° F.), any interaction ceased and the frit in the coating solidified, forming a porous, sorptive coated substrate, Panel X, upon the air cooling. This adherent coating on the substrate of Panel X after firing and cooling to room temperature had a thickness of from 3–4 mils, was dark in color, and had about 15 grams of coating per square foot of substrate.

EXAMPLE 3

A number of like 20-gauge steel panels described below were coated, fired, and cooled in the manner of Example 2 except as subsequently described, then rated for continuous cleaning ability as follows: bacon grease (about 15 mg. per square centimeter of coated panel surface) was brushed on the coated surface of a penal preheated to 375° F. in the form of a cross of stripes or a plurality of stripes. The panel was heated for one hour at a temperature of 375° F., then the tempreature was raised to 525° for two hours. Such heating constituted one test cycle. The rating system used in determining continuous cleaning effectiveness of the coating on the panel was based on an arbitrary scale of 0 to 10, the latter rating being the highest score. A score of 10 was awarded where no residual grease or resulting varnish and little or no apparent staining could be detected by the naked eye on the coating tested after one test cycle. A score of zero was awarded where most of the initially greased area was covered with a darkened or charred varnish-like glossy residue after a single test cycle.

| Panel | | Score |
| --- | --- | --- |
| 1 | Panel X of Example 2 | 10 |
| 2 | Made like Panel X, except that no enameling clay was used in the slip composition. | 10 |
| 3 | Made like Panel X, except that 20% finely divided magnesium powder, almost all 200 mesh or less, was used in place of the 20% aluminum powder. | 10 |
| 4 | Made like Panel X, except that 20% finely divided iron powder, almost all 200 mesh or less, was used in place of the 20% aluminum powder. | 6 |
| 5 | Made like Panel X, except that 20% finely divided silicon, almost all 200 mesh or less, was used in place of the 20% aluminum powder. | 5 |
| 6 | Made like Panel X, except that 20% finely divided copper, almost all 200 mesh or less, was used in place of the 20% aluminum powder. | 5 |
| 7 | Made like Panel X, except that 20% finely divided nickel, almost all 200 mesh or less, was used in place of the 20% aluminum powder. | 3 |
| 8 | Made like Panel X, except that 20% finely divided zinc, almost all 200 mesh or less, was used in place of the 20% aluminum powder. | 1 |
| 9 | Made like Panel X, except that finely divided metallic tin, almost all 200 mesh or less, was used in place of the 20% aluminum powder. | 1 |
| 10 | Made like Panel X, except that 20% finely divided nickel oxide, almost all 200 mesh or less, was used in place of the 20% aluminum powder. | 1 |
| 11 | Made like Panel X, except that 40% finely divided aluminum powder, almost all 200 mesh or less, was used in place of the 20% aluminum powder. | [1] 6 |
| 12 | Made like Panel X, except that 5% finely divided aluminum powder, almost all 200 mesh or less, was used in place of the 20% aluminum powder. | 4 |

[1] Also panel was light colored and stains were more easily detected as a result thereof.

EXAMPLE 4

A series of pertinent surfaces were checked for continuous cleaning by the test of Example 3. The scoring system used was also the same as in Example 3. The results were as follows:

| Panel surfaces tested | | Score |
| --- | --- | --- |
| 1 | Aluminum sheet metal | 0 |
| 2 | Panel made like Panel X in Example 2, except that no aluminum powder was used. | 0 |
| 3 | Conventional hydrocarbon cracking catalyst consisting of 25% alumina, the balance silica, ground to 325 mesh and deposited on a glass plate. | 3 |
| 4 | Made with aluminum power of Example 2, mixed into a paste with bacon grease, applied to a glass plate and subjected to a test cycle, the grease disappeared and the aluminum formed into an integral, apparently continuous coating. This was the aluminum coating surface tested and scored. | 0 |

EXAMPLE 5

The panel having about the best continuous cleaning properties found to date is made as follows:

Step 1.—A slip was prepared by mixing 100 parts of the pre-milled frit prepared in Example 1, 2 parts of a conventional porcelain enameling clay, ¼ part of a bentonite clay, 3/64 part barium chloride, 5/64 part sodium aluminate, and 50 parts water. The milling of these materials was conducted in a ball mill for a period of about 6 hours until only a trace of the particulate material in the enamel slip was retained on a 325 mesh Tyler Standard Sieve. The resultant slip had a specific gravity of about 1.75;

Step 2.—A binder solution was prepared by mixing 25 parts of a component alkylphenoxy polyethoxy ethanol sold under the trademark "Triton X–100" and produced by Rohm & Haas Company, 110 parts of a component consisting of an ammonia neutralized acrylic acid resin dispersed in water, the water constituting 75% by weight of the component, the material sold under the trademark "Acrysol P6N" by the Rohm & Haas Company, and 1975 parts water. Heating the mixture to about 100° F. or slightly above was helpful for dispersing the components in water;

Step 3.—A premix was formed by blending 25 parts of the binder solution formed in Step 2 and 43 parts of a paste consisting of 69% elemental aluminum powder as flake, having a fatty acid lubricant thereon, and also having a particle size of about 325 mesh in a vehicle of; 13% mineral spirits (preponderantly aliphatic hydrocarbons boiling between 300° and 390° F.), 12% 1-nitropropane, and a 6% of an alkyl aryl sulfonate wetting agent. This paste is sold under the trademark of "Hydropaste" by the Aluminum Company of America. Other aluminum pastes of this type which are particularly suitable for practicing the present invention are described in U.S. Pat. 2,848,344. After the Hydropaste was substantially blended, an additional 25 parts of binder solution is mixed to form the premix;

Step 4.—175 parts of the slip prepared in Step 1 was blended by blunging in an open agitated vessel with all of the premix prepared in Step 3. Blending was conducted until substantially all of the resultant slip formed from such blending was free from lumps. The specific gravity of this slip after blending was about 1.45.

It has been found that by adding the finely divided elemental aluminum in the manner set forth the shelf life of the resultant slip is greatly increased. It is known in the art that if unstabilized finely divided elemental aluminum is mixed with the enameling composition and water, substantial gassing occurs and the slip on standing tends to be unstable.

Step 5.—The slip formed in Step 4 was sprayed onto a conventional 20-gauge steel panel substrate conventionally prepared for and commonly used in the production of walls for ovens in kitchen stoves, to produce about 25–33 grams of wet coating per square foot of substrate or from about 15–20 grams of dry coating per square foot of substrate;

Step 6.—The wet coating was dried at about 300° F. for a period of about 10 minutes to produce a coating ostensibly dry to the touch;

Step 7.—After drying, the panel was placed in a muffle furnace for firing. Firing was conducted at a temperature of 1500° for a period of 3 minutes. It is estimated that about 1 minute was required for the coated substrate to reach the firing temperature of 1500° F. and about 2 minutes of soaking time at 1500° F. for the interaction of the aluminum and frit to occur. At the end of the 3 minute firing time, the coated substrate was removed from the muffle furnace to an ambient air cooling zone and allowed to cool to room temperature. The coating on the fired substrate was approximately 3–4 mils in thickness and exhibited excellent continuous cleaning properties. Photomicrographs of this resultant coating are shown in FIGS. 11, 12 and 13.

The process as set forth in Steps 1–7 was carried out except that the coating was applied over a porcelain enamel ground coat as a cover coat. This resultant cover coat exhibited excellent continuous cleaning properties.

Another coated substrate having about the same continuous cleaning properties was prepared in the same manner as set forth in Steps 1–7, except that the premilled frit contained no cobalt.

Kitchen ranges with ovens were produced in a manufacturing plant having as follows: the metal oven walls were prepared substantially in accordance with Steps 1–7 and were incorporated into the ranges to enclose the oven area. The walls exhibited excellent continuous cleaning properties.

EXAMPLE 6

Three panels, A, B and C, were produced according to Example 2, except that the frit used in making the coating was premilled as follows:

(a) The frit for Panel A was ground in a ball mill for 2½ hours. 18.7% of this frit was retained on a 200 mesh Tyler Standard Sieve;

(b) The frit for Panel B was ground for 6 hours in the same manner as the frit in (a), 1.4% of this frit was retained on a 325 mesh screen; and (c) The frit for Panel C was ground for 11 hours in the same equipment that in which the two foregoing frits were ground, then 600 grams of the resulting grind was further milled in a 1000 gram ball mill for an additional 60 minutes. Only 0.2% of this frit was retained on a 400 mesh Tyler Standard Sieve.

Figure 3:
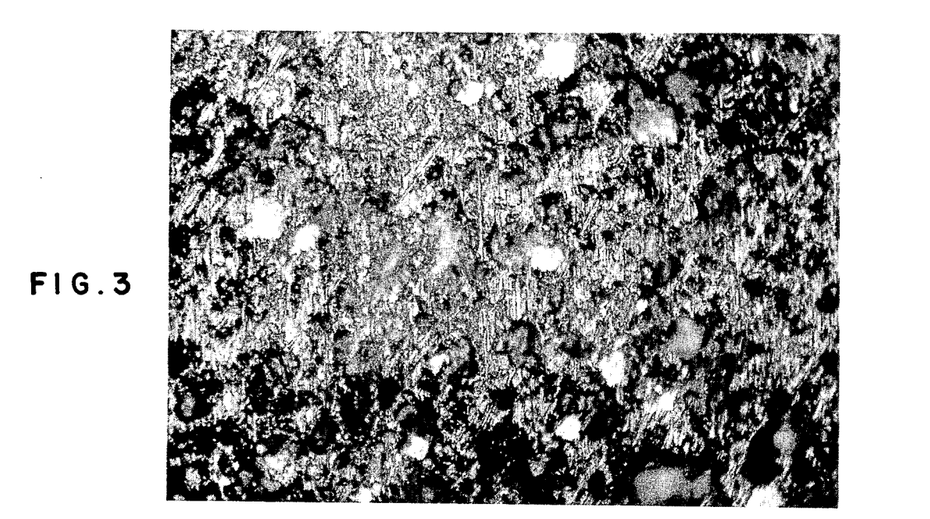
FIG. 3 is a photomicrograph at 340× magnification of a top view with oblique lighting of a substrate steel panel having the adherent ceramic sorptive coating produced according to the method described in Example 6. The sample was prepared and ground as the sample described in FIG. 1. The particles used in making this coating were of a fineness such that only a trace was retained on a 400 mesh Tyler Standard Sieve. This coating has performed as one of the better of those formulated to date.

Panel A is illustrated in FIGS. 1 and 2. Panel C is illustrated in FIGS. 3 and 4.

FIGS. 1 and 2 show a surface which has a highly irregular matrix having fairly large voids therein. On critical viewing, it can be noted that the coating of FIGS. 3 and 4 appears to have a more uniform and more porous structure than the coating of FIGS. 1 and 2.

Figure 4:
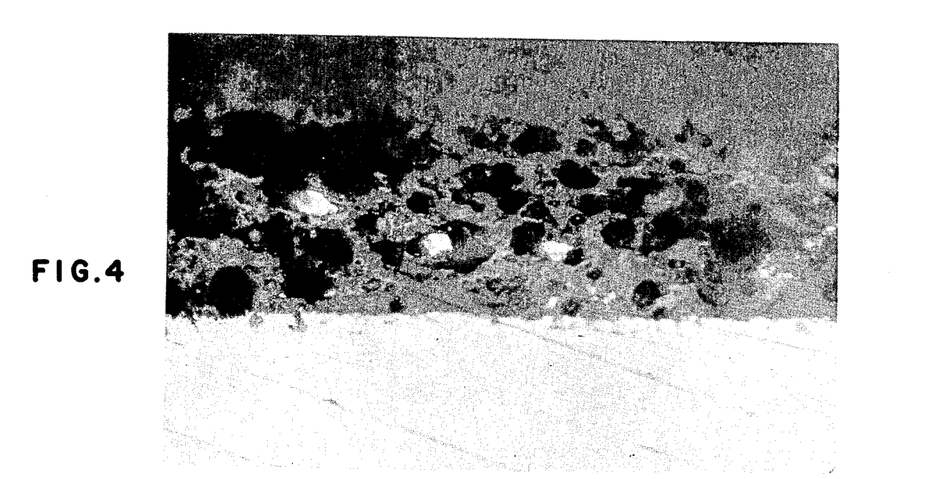
FIG. 4 is a photomicrograph at 610× magnification of a cross section of the substrate steel panel and coating shown in FIG. 3. The coating appears to be more highly porous than the coating shown in FIG. 2, with the pores being smaller and more uniformly distributed than those in FIG. 2.

FIGS. 2 and 4 representing the cross section of panels A and C, respectively, show that voids, cracks, small pores, etc., are present underneath the top surface of the coating and for the most part, these voids underneath the surface have an accessible route to the top of the surface, these routes created by the small pores and crevices. In addition, the coating of FIG. 4 has many more and smaller voids than that of FIG. 2, and they are more uniformly spaced within the coating. It is also apparent that there is more elemental aluminum present (bright areas) in the coating shown in FIG. 2 than in the coating of FIG. 4, but in both instances, there is at least some elemental aluminum present in the fired ceramic coating.

Panels A, B and C were soiled with thin stripes of bacon fat and refined corn oil in a like manner, and subjected to the test described and rated in Example 3. The effectiveness of the coating with respect to continuous cleaning properties and residual stain, using the scoring system of Example 3, is set forth in the following table:

| Panel | Screen analysis of frit | Score | Residual stain |
|---|---|---|---|
| A | 18.7% on 200 mesh | 6 | Some deposit left (moderate trace). |
| B | 1.4% on 325 mesh | 8 | Slight trace. |
| C | 0.2% on 400 mesh | 10 | Virtually no stain. |

This example shows that continuous cleaning effectiveness increased generally with the increasing fineness of the grind of frit.

EXAMPLE 17

The comparative continuous cleaning effectiveness of otherwise identical panels prepared under a fast fire and slow fire, respectively, was determined in a manner as set forth in Example 2. The substrate and coating preparation up to fire were the same as in Example 2. Panel A was subjected to a "Hot Point" fire test (fast fire); Panel B was subjected to a "Cold Point" fire test (slow fire). The "Hot Point" fire test was conducted by placing the coated panel of 20 gauge steel, having the dimensions of 4" in width and 6" in length, and fired on points in a muffle furnace in the presence of air at a temperature of 1480° F. for 4 minutes. The "Cold Point" fire test was conducted by placing the panel over a sheet of cast iron having identical width and length dimensions, but being ¼" in thickness, and firing for 10 minutes in the same furnace maintained at the same temperature. The second panel during firing was held about 1/16 of an inch from the surface of the cast iron plate by means of wire supports. The results of the continuous cleaning test for the two panels is set forth in the following table:

PANEL A

Hot point test

Effectiveness ______________________________ 10
Residual stain ____________________________ None

PANEL B

Cold point test

Effectiveness _______________________________ 7
Residual stain ______________________ Moderate

EXAMPLE 8

The effectiveness with respect to continuous cleaning properties of the panel produced according to Example 5 was compared with a conventional, commercial, continuous cleaning panel having an oxidizing catalyst embedded in the surface thereof. Each panel was stained with bacon fat and corn oil and tested in the manner of Example 3. At the end of one test cycle, the panel produced in accordance with Example 5 had no apparent stain and achieved an effectiveness rating of 10. The commercial panel had a slight to moderate stain remaining on the surface, indicating that not all of the corn oil and bacon fat residue was removed; a rating of 8 was assigned to this coating.

EXAMPLE 9

Another glass frit suitable for preparing panels having continuous cleaning properties was prepared by smelting the materials set forth in Table A by weight at a temperature of 2100° F. and quenching the molten material. The frit had a calculated oxide analysis as set forth in Table B. The frit had an incipient deformation point of about 900–950° F.

TABLE A

| | Percent by wt. |
|---|---|
| Quartz | 34.7 |
| Borax | 21.8 |
| Feldspar | 19.9 |
| Soda ash | 11.2 |
| Fluorspar | 5.4 |
| Sodium nitrate | 4.9 |
| Lithium manganite | 2.1 |
| | 100.0 |

TABLE B

Calculated oxide analysis (percent)

| | |
|---|---|
| $SiO_2$ | 53.11 |
| $B_2O_3$ | 16.49 |
| $Na_2O$ | 15.10 |
| $K_2O$ | 2.23 |
| $Li_2O$ | 0.59 |
| CaO | 4.30 |
| $Al_2O_3$ | 3.64 |
| $MnO_2$ | 1.73 |
| F | 2.81 |

EXAMPLE 10

Two coated panels were prepared using the frit of Example 9, except one panel was fired at a temperature of 1380° F. for 4 minutes and the other was fired at 1480° F. for 4 minutes. Both panels, except for firing, were prepared in the same manner as substantially set forth in Steps 1–6 in Example 5. Photomicrographs of the panel fired at 1380° F. appear as FIGS. 5, 6 and 7 and photomicrographs of the panel fired at 1480° F. appear as FIGS. 8, 9 and 10. The panel fired at 1380° F. exhibited good continuous cleaning properties whereas the panel fired at 1480° F. appear to be overfired and was less effective for continuous cleaning than the panel fired at 1380° F. It is to be noted that fewer and also larger voids and crevices were detected in the panel fired at 1480° F. than the panel fired at 1380° F.

EXAMPLE 11

A panel was prepared substantially in the same manner as set forth in Example 5, Steps 1–6, except for firing, for purposes of comparing the effect of firing temperature on continuous cleaning properties. Here, firing was conducted at a temperature of 1700° for 3 minutes. Photomicrographs of this fired panel are shown as FIGS. 14, 15 and 16. While the panel exhibited fair continuous cleaning properties, it would have been inferior to the panel prepared in Example 5, whereas the panel fired at 1500° for 3 minutes as shown in Example 5 achieved a scoring of 10. This test showed that for the particular composition, the firing was verging on slight "overfiring."

EXAMPLE 12

A frit prepared by smelting conventional batch materials under substantially the same conditions as set forth in Example 1 was found useful when substituted for the frit of Example 5. The frit had an oxide analysis of, as set forth in Table A:

TABLE A

| | Oxide analysis (percent) |
|---|---|
| Silicon dioxide | 26.8 |
| Boron oxide | 17.3 |
| Phosphorus pentoxide | 1.0 |
| Calcium oxide | 6.6 |
| Barium oxide | 13.1 |
| Sodium oxide | 14.5 |
| Potassium oxide | 0.8 |
| Aluminum oxide | 4.0 |
| Zirconium oxide | 3.4 |
| Fluorine | 4.3 |
| Zinc oxide | 6.4 |
| Molybdenum oxide | 2.3 |

The frit had an incipient deformation point of about 900° F.

EXAMPLE 13

Another frit was substituted for the frit of Example 12 in preparing a coating and was found to be suitable for producing a coating having very good continuous cleaning properties. The frit had an oxide analysis as set forth in Table A. The incipient deformation point was about 950–1000° F.

TABLE A

| | Oxide analysis (percent) |
|---|---|
| Silicon dioxide | 33.1 |
| Boron oxide | 17.3 |
| Phosphorus pentoxide | 0.8 |
| Calcium oxide | 6.7 |
| Magnesium oxide | 0.2 |
| Barium oxide | 13.2 |
| Sodium oxide | 15.3 |
| Potassium oxide | 0.9 |
| Aluminum oxide | 4.7 |
| Fluorine | 4.3 |
| Nickel oxide | 1.4 |
| Cobalt oxide | 0.5 |
| Manganese oxide | 1.2 |
| Strontium oxide | 0.2 |
| Ferric oxide | 0.1 |

EXAMPLE 14

Another frit was substituted for the frit of Example 12 in preparing a coating and was found to be suitable for producing a coating having very good continuous cleaning properties. The frit had an oxide analysis as set forth in Table A. The frit composition had an incipient deformation point of 900° F.

TABLE A

| | Oxide analysis (percent) |
|---|---|
| Silicon dioxide | 27.1 |
| Boron oxide | 16.8 |
| Phosphorus pentoxide | 1.0 |
| Calcium oxide | 6.8 |
| Barium oxide | 13.9 |
| Lithium oxide | 0.6 |
| Sodium oxide | 13.5 |
| Potassium oxide | 1.8 |
| Aluminum oxide | 4.5 |
| Fluorine | 5.4 |
| Zinc oxide | 3.2 |
| Molybdenum oxide | 4.21 |
| Antimony oxide | 1.1 |

EXAMPLE 15

Another frit was substituted for the frit of Example 12 in preparing a coating and was found to be suitable for producing a coating having good continuous cleaning properties. The frit had an oxide analysis as set forth in Table A.

TABLE A

| | Oxide analysis (percent) |
|---|---|
| Silicon dioxide | 1.3 |
| Boron oxide | 7.0 |
| Phosphorus pentoxide | 44.5 |
| Sodium oxide | 22.8 |
| Aluminum oxide | 20.5 |
| Fluorine | 4.7 |

The frit had an incipient deformation point of about 750-800° F.

While the coated substrates having the porous, sorptive surface have been found effective for removing and diminishing degradable carbonaceous products found in cooking devices, such as kitchen ranges, it is conceivable that these coatings would also be effective for diminishing degradable carbonaceous products in other apparatus. In addition, carbonaceous products could be contained in gases, or are gases in themselves, such as carbon monoxide and light hydrocarbons. Examples of such apparatus include automotive and other mufflers, heat exchangers, turbine blades, burner grates, burner bowls, prefabricated fireplaces, griddles, carburization chambers, annealing chamber bells, combustion chambers, brazier bowls, habachis, stove pipes, and the like. Additionally, the porous ceramic coating of this invention can be suitable as a surface for application of polymeric coatings such as polytetrafluoroethylene. Furthermore, the coating be useful in fuel afterburners, and grease collectors and eliminators.

What is claimed is:

1. In a process for forming an adherent ceramic coating on a metallic substrate used in food cooking apparatus, the coating having the property of diminishing the accumulation of carbonaceous residue which results from exposure to cooking grease spatters, the improvement which comprises:

(a) applying to said substrate in intimate contact with each other an enameling composition comprising alkali bearing glass frit particles, about ½ to 25% halide basis weight of said glass frit, and about 2 to 75 parts per 100 parts of solids content of said enameling composition of particulate elemental metal selected from the group consisting of aluminum, magnesium, high alloys of either, and mixtures of same;

(b) heating the resulting coated substrate in a heating zone until it forms by interaction of said enameling composition and particulate metal an integral, porous, sorptive surface structure containing crystalline devitrification products;

(c) arresting said interaction in a cooling zone before substantial coalescence of said structure occurs.

2. The process of claim 1 wherein said enameling composition and said elemental metal are formed into a slip, and the slip is deposited directly on metal substrate.

3. The process of claim 1 wherein said enameling composition and said metal are formed into a slip and the slip is deposited on ground coated metal substrate.

4. The process of claim 1 wherein the heating of the deposit is done sufficiently rapidly to pass from the incipient deformation point of the frit to the firing temperature of the frit in less than about 7 minutes, and the reaction between the elemental metal particles and the frit is continued for not more than 6 minutes before arresting the reaction.

5. The process of claim 1 wherein the glass frit particles have at least a portion of the halide smelted therein, and said halide is predominantly fluoride.

6. The process of claim 1 wherein said halide is supplied at least in part to the enameling composition as a mill addition, and said halide is predominantly fluoride.

7. The process of claim 1 wherein said glass frit particles are alkali borosilicate frits.

8. The process of claim 1 wherein said glass frit particles are alkali alumino phosphate frits.

9. A cooking range part comprising a metallic substrate having an adherent ceramic coating produced in accordance with the process of claim 1.

10. The part of claim 9 which is an oven wall panel.

11. In a cooking device having means for heating the cooking area, means for supporting food to be cooked, and a wall that is partially enclosing said cooking area, the improved wall comprising the panel of claim 10.

References Cited

UNITED STATES PATENTS

| 3,203,815 | 8/1965 | Michael | 117—129(X) |
| 3,114,646 | 12/1963 | Currie | 117—129(X) |
| 2,977,251 | 3/1961 | Long et al. | 117—129(X) |
| 2,900,276 | 8/1959 | Long et al. | 117—70 |
| 2,898,253 | 8/1959 | Schneider et al. | 117—23(X) |
| 2,898,236 | 8/1959 | Long et al. | 117—124 |

RALPH S. KENDALL, Primary Examiner

C. WESTON, Assistant Examiner

U.S. Cl. X.R.

117—70, 97; 126—273